(12) United States Patent
Ide

(10) Patent No.: US 7,504,584 B2
(45) Date of Patent: Mar. 17, 2009

(54) WATER-STOP STRUCTURE OF SHEATHED WIRE

(75) Inventor: Tetsuro Ide, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 795 days.

(21) Appl. No.: 10/744,106

(22) Filed: Dec. 24, 2003

(65) Prior Publication Data

US 2004/0177991 A1    Sep. 16, 2004

(30) Foreign Application Priority Data

Dec. 27, 2002   (JP) ............... P2002-382556
Jul. 8, 2003    (JP) ............... P2003-271816

(51) Int. Cl.
*H02G 15/113* (2006.01)

(52) U.S. Cl. ....................................... 174/92

(58) Field of Classification Search ............... 174/88 R, 174/92, 94 R
See application file for complete search history.

(56) References Cited

U.S. PATENT DOCUMENTS

| 5,922,993 | A  | * | 7/1999  | Ide et al. ..................... 174/84 R |
| 6,039,592 | A  | * | 3/2000  | Shinchi ....................... 439/271 |
| 6,226,865 | B1 | * | 5/2001  | Tanikawa et al. ............. 29/872 |
| 6,657,126 | B2 | * | 12/2003 | Ide et al. ..................... 174/78 |
| 2002/0163415 | A1 | * | 11/2002 | Ide et al. ..................... 336/206 |

FOREIGN PATENT DOCUMENTS

| JP | 07-320842 A | 12/1995 |
| JP | 7-322467 A | 12/1995 |
| JP | 9-320650 A | 12/1997 |
| JP | 9-320652 A | 12/1997 |
| JP | 11-250952 A | 9/1999 |
| JP | 2000-102981 A | 4/2000 |
| JP | 2000-202642 A | 7/2000 |
| JP | 2000-326413 A | 11/2000 |
| JP | 2001-067952 A | 3/2001 |

OTHER PUBLICATIONS

Japanese Office Action issued Dec. 26, 2007 for the corresponding Japanese Patent Application 2003-271816.

* cited by examiner

*Primary Examiner*—Chau N Nguyen
(74) *Attorney, Agent, or Firm*—Sughrue Mion, PLLC

(57) ABSTRACT

In a water-stop structure of a sheathed wire of the invention, a water-stop member includes an upper member and a lower member, and the upper member has a recess disposed above water-stop portions so that ultrasonic vibrations of an ultrasonic horn can be transmitted to the water-stop portions from a region closer to the water-stop portions. The ultrasonic horn has a protrusion which is formed on a lower surface thereof, and can be fitted to the recess in the upper member. In this sheathed wire water-stop structure, vibrations of the ultrasonic horn can be transmitted to the water-stop portions from the region closer to the water-stop portions, and therefore the ultrasonic vibrations can be efficiently transmitted, so that the welding time can be reduced, and besides the production cost can be reduced.

2 Claims, 7 Drawing Sheets

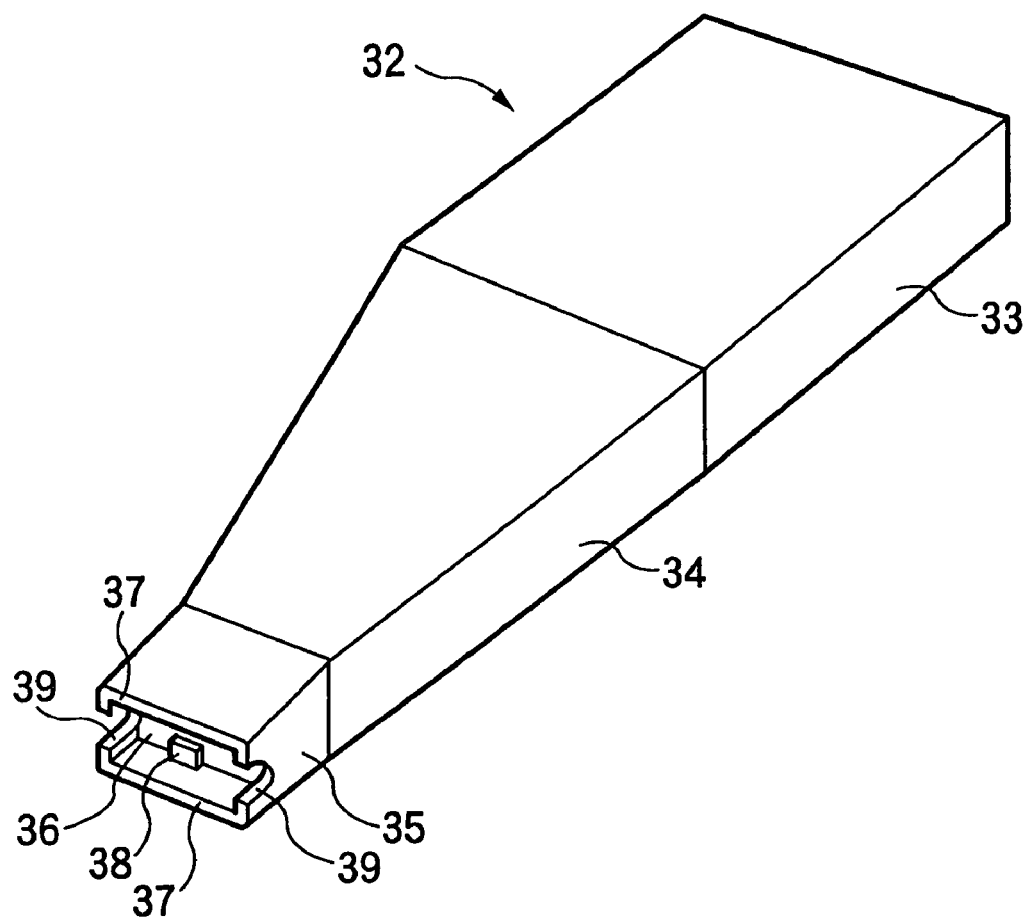

WATER-STOP STRUCTURE OF SHEATHED WIRE

The present application is based on Japanese Patent Applications Nos. 2002-382556 and 2003-271816, the entire contents of which are incorporated herein by reference.

BACKGROUND OF THE INVENTION

1. Field of the Invention

This invention relates to a structure of a sheathed wire, in which the sheathed wire, having a conductor covered with a sheath, is gripped by a resin-molded water-stop member, and a water-stop treatment is applied to the sheathed wire by ultrasonically welding the water-stop member.

2. Related Art

In one known conventional water-stop structure of a sheathed wire as shown in FIGS. 9 and 10, a sheathed wire 60 is held between a pair of upper and lower (FIG. 9) resin-molded water-stop members 61, and ultrasonic waves are applied from an ultrasonic horn 62, disposed above (FIG. 9) the water-stop members 61, to the water-stop members 61 to weld the water-stop members 61 to conductors of the sheathed wire, thus achieving a water-stop treatment (see JP-A-7-320842 and JP-A-11-250952).

There is also disclosed an ultrasonic welding horn which is so constructed as to prevent forced-out conductors of a wire from being cut at the time of welding the conductors of the wire to a metal plate. In this ultrasonic welding horn, continuous recesses and ridges are formed in a side wall of the horn, and the recesses serve as relief spaces for receiving the force-out conductors (see JP-A-2000-202642). This ultrasonic welding horn is designed to weld the wire to the metal plate and also to prevent the wire from being cut by the ultrasonic welding horn, and this ultrasonic welding horn is not designed to apply a water-stop treatment to the sheathed wire.

Further, there is shown a method of welding or fusing a first synthetic resin member and a second synthetic resin member together (see JP-A-2000-326413). A recessed portion against which an ultrasonic horn is adapted to be pressed is formed in the first synthetic resin member, and the horn is pressed against this recessed portion, and therefore even when a bottom surface of the recessed portion melts, this molten resin will not flow out to the surface of the first synthetic resin member (see JP-A-2000-326413). This method is a method for welding the two synthetic resin members together, and does not relate to a structure of applying a water-stop treatment to a sheathed wire.

In the above conventional water-stop structure of the sheathed wire 60 disclosed in JP-A-7-320842 and JP-A-11-250952, the distance L of transmitting of ultrasonic vibrations from the ultrasonic horn 62 increases with the increase of the thickness of the sheathed wire 60 to be subjected to the water-atop treatment, and therefore the ultrasonic waves are not efficiently transmitted, which results in a problem that much time is required for this processing, so that the cost inevitably increases (see FIG. 10). And besides, the larger the thickness of the wire is, the less the ultrasonic vibrations are transmitted to the whole of the wire to be welded, and as a result the melting and filling of the resin are not sufficiently effected, so that the water-stop performance is lowered.

SUMMARY OF THE INVENTION

It is an object of this invention to provide a water-stop structure of a sheathed wire in which a water-stop treatment for the sheathed wire is positively effected, and a welding time is shortened so as to reduce the cost.

1) A water-stop structure of a sheathed wire of the invention wherein the sheathed wire, having a conductor covered with a sheath, is gripped by a resin-molded water-stop member, and a water-stop treatment is applied to the sheathed wire by welding water-stop portions by an ultrasonic horn, is characterized in that the water-stop member comprises an upper member and a lower member, and the upper member has a recess disposed above the water-stop portions, and the ultrasonic horn has a protrusion which is formed on a lower surface thereof, and can be fitted to the recess in the upper member so that ultrasonic vibrations of the ultrasonic horn can be transmitted to the water-stop portions from a region closer to the water-stop portions.

In the sheathed wire water-stop structure of the above construction, the upper member has the recess disposed above the water-stop portions, and the ultrasonic horn has the protrusion which is formed on the lower surface thereof, and can be fitted to the recess. Therefore, vibrations of the ultrasonic horn can be transmitted to the water-stop portions from the region closer to the water-stop portions, and therefore the ultrasonic vibrations can be efficiently transmitted, so that the welding time can be reduced, and besides the production cost can be reduced.

2) In the sheathed wire water-stop structure of the invention, preferably, a wall portion for covering the upper member of the water-stop member is formed at a peripheral edge portion of the lower surface of the ultrasonic horn.

In the sheathed wire water-stop structure of the above construction, the wall portion is formed at the peripheral edge portion of the lower surface of the ultrasonic horn, and during the welding operation, this wall portion covers the upper member of the water-stop member, and therefore ultrasonic vibrations are efficiently transmitted to the water-stop portions, so that the melting and filling of the resin are effected rapidly, thereby greatly enhancing the water-stop performance.

3) In the sheathed wire water-stop structure of the invention, preferably, openings for the passage of the sheathed wire therethrough are formed in the wall portion of the ultrasonic horn.

In the sheathed wire water-stop structure of the above construction, the wire passes through the openings, and therefore the wall portion can cover the upper portion of the water-stop member, and can also cover the lower portion thereof if necessary, and therefore even if the water-stop structure has an increased thickness, ultrasonic vibrations can be effectively transmitted to the water-stop portions, so that the welding time will not become long.

4) A water-stop structure of a sheathed wire of the invention wherein the sheathed wire, having a conductor covered with a sheath, is gripped by a resin-molded water-stop member, and a water-stop treatment is applied to the sheathed wire by welding water-stop portions by an ultrasonic horn, is characterized in that the water-stop member comprises an upper member and a lower member, and has projected portions formed thereon to increase a thickness of those portions of the water-stop member disposed near to outlet portions for the sheathed wire, and the ultrasonic horn has groove portions which are formed in a lower surface thereof, and can be fitted on the projected portions, formed on the upper and lower members, without contacting the projected-portions.

In the sheathed wire water-stop structure of the above construction, the water-stop member has the projected portions formed thereon to increase the thickness of those portions of the water-stop member disposed near to the outlet portions for the sheathed wire, and the ultrasonic horn has the groove portions which are formed in the lower surface thereof, and can be fitted on the projected portions without contacting the projected portions. Therefore, the strength of the wire outlet portions of the water-stop member is markedly increased, and these wire outlet portions are completely prevented from cracking during the ultrasonic welding, thus preventing the external appearance from being injured by such cracking. And besides, the water-stop performance is enhanced. Furthermore, the groove portions are so constructed as to fit on the projected portions of the water-stop member without contacting these projected portions, and therefore the ultrasonic energy will not be transmitted directly to the weak portions (that is, the wire outlet portions) of the water-stop structure, so that cracks are prevented from developing in these weak portions during the ultrasonic welding. Therefore, the water-stop performance of a predetermined level can be secured.

As described above, in the sheathed wire water-stop structure of the present invention, the water-stop member comprises the upper member and the lower member, and the upper member has the recess disposed above the water-stop portions, and the ultrasonic horn has the protrusion which is formed on the lower surface thereof, and can be fitted to the recess in the upper member so that ultrasonic vibrations of the ultrasonic horn can be transmitted to the water-stop portions from the region closer to the water-stop portions. Therefore, vibrations of the ultrasonic horn can be transmitted to the water-stop portions from the region closer to the water-stop portions, and therefore the ultrasonic vibrations can be efficiently transmitted, so that the welding time can be reduced, and besides the production cost can be reduced.

In the sheathed wire water-stop structure of the invention, the wall portion for covering the upper member of the water-stop member is formed at the peripheral edge portion of the lower surface of the ultrasonic horn. Therefore, during the welding operation, this wall portion covers the upper member of the water-stop member, and therefore ultrasonic vibrations are efficiently transmitted to the water-stop portions, so that the melting and filling of the resin are effected rapidly, thereby greatly enhancing the water-stop performance.

In the sheathed wire water-stop structure of the invention, the openings for the passage of the sheathed wire therethrough are formed in the wall portion of the ultrasonic horn. Therefore, the wire passes through the openings, and therefore the wall portion can cover the upper portion of the water-stop member, and can also cover the lower portion thereof if necessary, and therefore even if the water-stop structure has an increased thickness, ultrasonic vibrations can be effectively transmitted to the water-stop portions, so that the welding time will not become long.

In the sheathed wire water-stop structure of the invention, the water-stop member comprises the upper member and the lower member, and has the projected portions formed thereon to increase the thickness of those portions of the water-stop member disposed near to the outlet portions for the sheathed wire, and the ultrasonic horn has the groove portions which are formed in the lower surface thereof, and can be fitted on the projected portions, formed on the upper and lower members, without contacting the projected portions. Therefore, the strength of the wire outlet portions of the water-stop member is markedly increased, and these wire outlet portions are completely prevented from cracking during the ultrasonic welding, thus preventing the external appearance from being injured, and besides the water-stop performance is enhanced. Furthermore, the groove portions are so constructed as to fit on the projected portions of the water-stop member without contacting these projected portions, and therefore the ultrasonic energy will not be transmitted directly to the weak portions (that is, the wire outlet portions) of the water-stop structure, so that cracks are prevented from developing in these weak portions during the ultrasonic welding.

BRIEF DESCRIPTION OF THE DRAWINGS

FIG. 3 is a perspective view of an ultrasonic horn used in the sheathed wire water-stop structure of FIG. 1.

FIG. 4A is a cross-sectional view showing a condition before the water-stop member is welded, and FIG. 4B is a cross-sectional view taken along the line B-B of FIG. 2, showing a condition in which the water-stop member is welded.

DETAILED DESCRIPTION OF THE PREFERRED EMBODIMENTS

Figure 1:
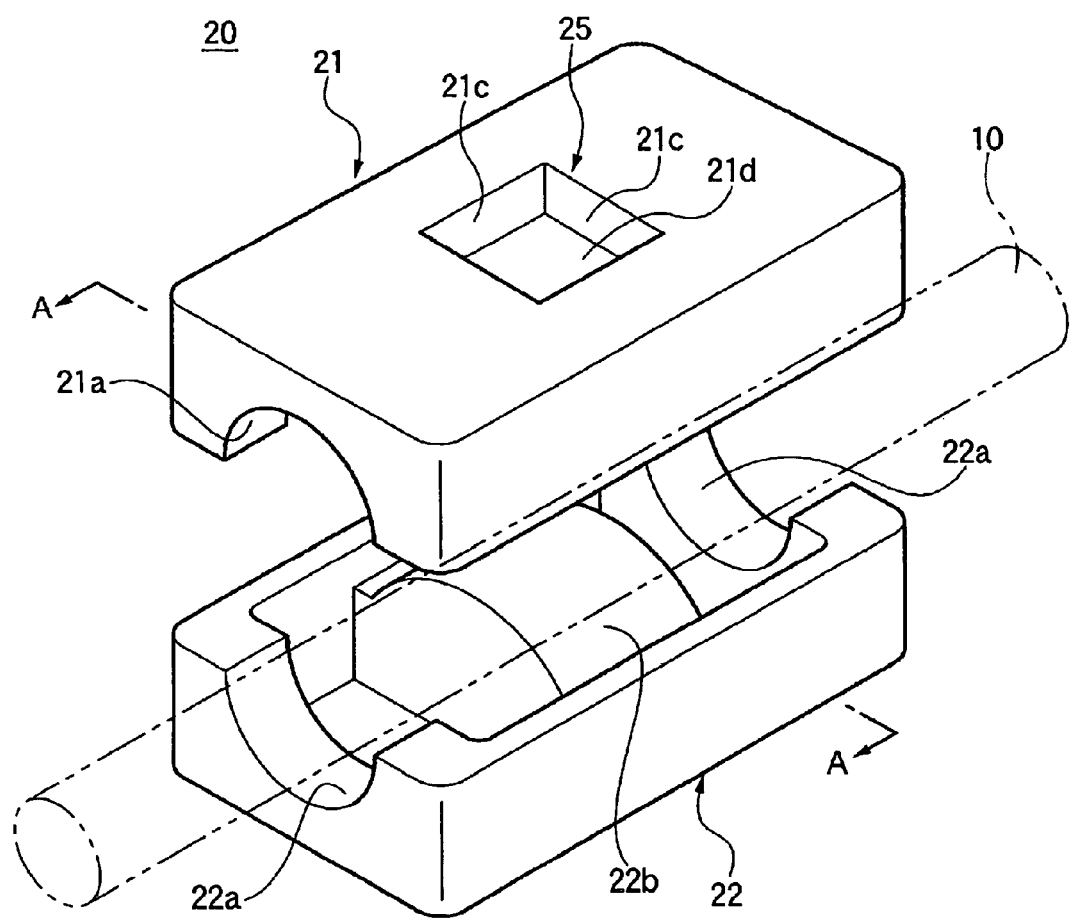
FIG. 1 is an exploded, perspective view showing one preferred embodiment of a sheathed wire water-stop structure of the invention.
Figure 2:
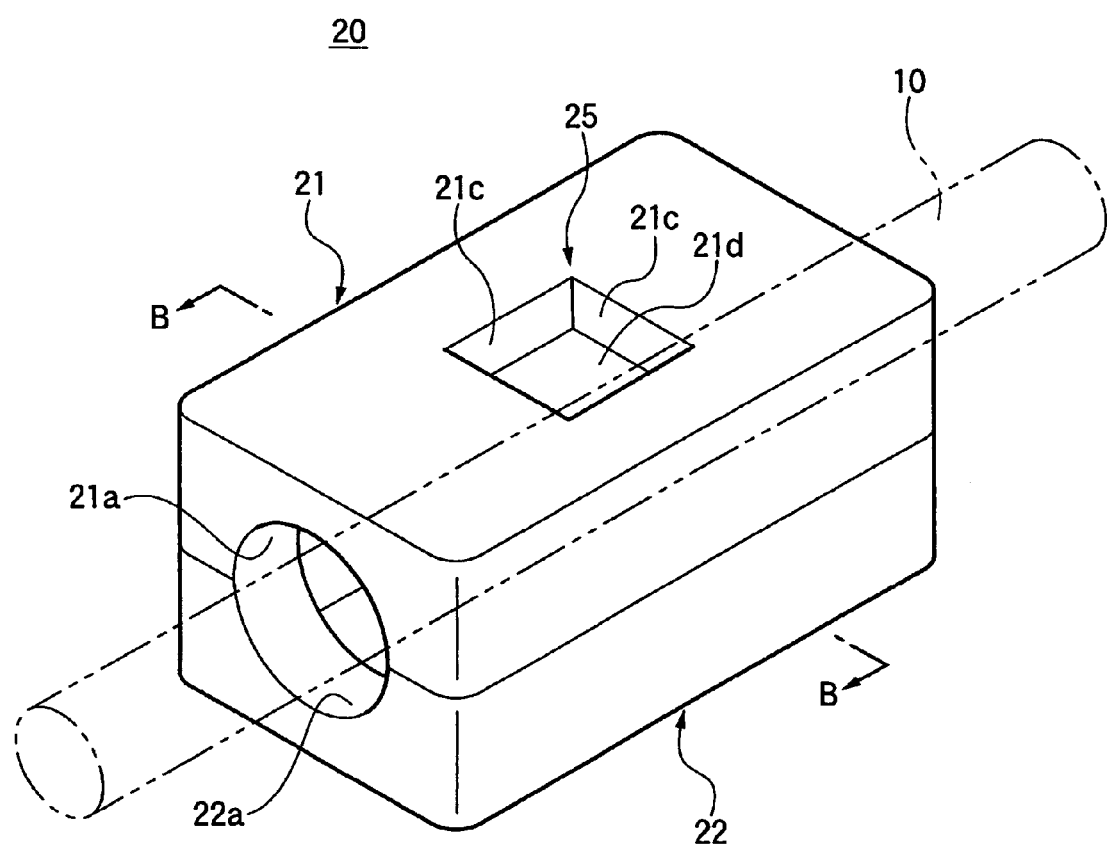
FIG. 2 is a perspective view of the water stop structure of FIG. 1, showing a condition after ultrasonic welding is effected.
Figure 4A:
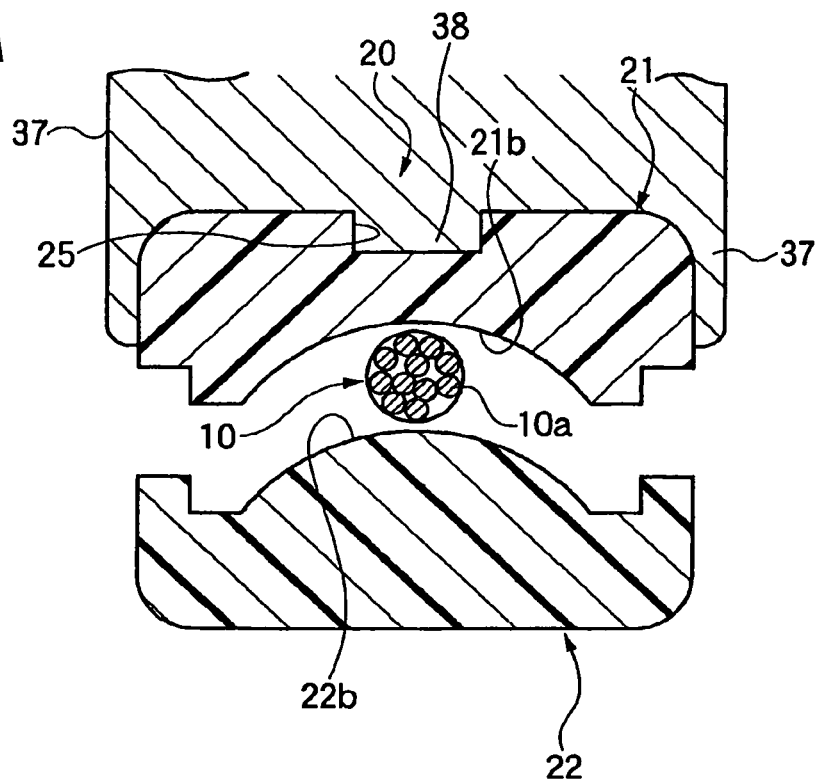
FIGS. 4A and 4B are cross-sectional views of a water-stop member of the water-stop structure of FIG. 1.
Figure 4B:
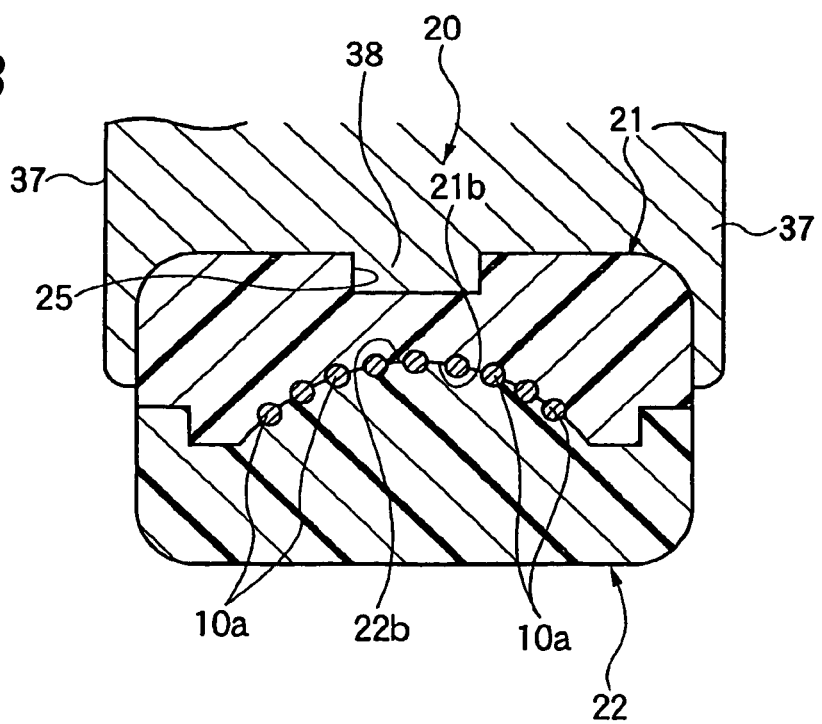
Figure 5:
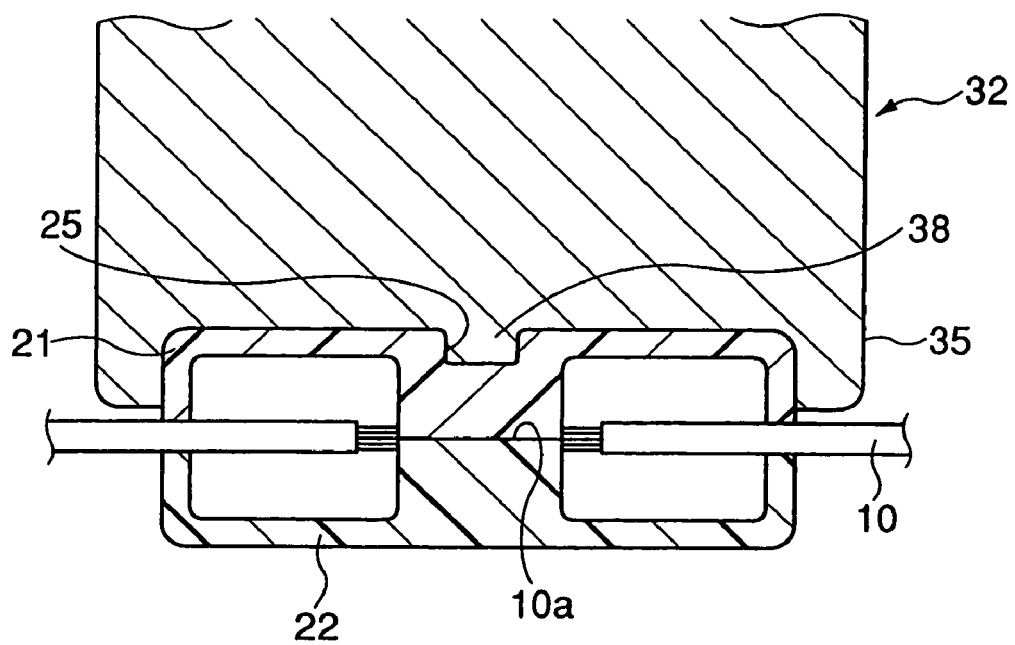
FIG. 5 is a cross-sectional view of the water-stop member of the water-stop structure in the first embodiment of the invention.

One preferred embodiment of a sheathed wire water-stop structure of the present invention will now be described with reference to FIGS. 1 to 5. FIG. 1 is an exploded, perspective view showing one preferred embodiment of the sheathed wire water-stop structure of the invention, and FIG. 2 is a perspective view of the water stop structure of FIG. 1, showing a condition after ultrasonic welding is effected. FIG. 3 is a perspective view of an ultrasonic horn used in the sheathed wire water-stop structure of the invention, and FIGS. 4A and 4B are cross-sectional views of the water-stop structure of FIG. 1, and FIG. 4A is a cross-sectional view taken along the line A-A of FIG. 1, showing a condition before the sheathed wire is gripped by this water-stop structure, and FIG. 4B is a cross-sectional view taken along the line B-B of FIG. 2, showing a condition in which the sheathed wire is ultrasonically welded. FIG. 5 is a longitudinal cross-sectional view of the water-stop structure of FIG. 1 during a welding operation.

Referring to FIGS. 1 to 5 the water-stop structure of the sheathed wire 10 includes a water-stop member 20 made of a synthetic resin, and this water stop member 20 comprises an upper member 21 and a lower member 22. The sheathed wire 10, having conductors 10a (see FIGS. 4A and 4B) covered with a sheath, is held between the upper member 21 and the lower member 22, and in this condition ultrasonic vibrations are applied to the sheathed wire from the upper side by the ultrasonic welding horn, thereby applying a water-stop treatment to the sheathed wire 10 (see FIGS. 4A and 4B).

The water-stop structure of this embodiment comprises the water-stop member 20 having the upper member 21 and the lower member 22. A pair of wire guide grooves 21a are formed respectively in opposite (right and left in FIGS. 1 and 2) side walls of the upper member 21, and a pair of wire guide grooves 22a are formed respectively in opposite (right and left) side walls of the lower member 22, these wire guide grooves 21a and 22a serving to guide the sheathed wire 10. The upper member 21 has a water-stop portion 21b formed midway between the pair of wire guide grooves 21a, and the lower member 22 has a water-stop portion 22b formed midway between the pair of wire guide grooves 22a. The water-stop portions 21b and 22b extend transversely to the sheathed wire and are adapted to be ultrasonically welded to the conductors 10a of the sheathed wire 10.

The water-stop portion 21b of the upper member 21 is formed into a concave shape, and has a curved shape corresponding to the outer shape of the sheathed wire 10. The water-stop portion 22b of the lower member 22 is formed into a convex shape corresponding to the concave shape of the water-stop portion 21b, and the water-stop portion 22b has a convexly-curved shape corresponding to the concavely-curved shape of the water-stop portion 21b. A recess 25 is formed in a central portion of the upper member 21 disposed above the water-stop portion 21b. This recess 25 is defined by four side wall surfaces 21c, disposed perpendicularly to a flat upper surface of the upper member 21, and a bottom wall surface 21d.

FIG. 3 shows the ultrasonic horn 32. This ultrasonic horn 32 includes a body portion 33, a central portion 34 which extends from the body portion 33, and has tapering side walls, and a distal end portion 35. A wall portion 37 for covering the upper member 21 of the water stop member 20 is formed at a peripheral edge portion of a lower surface 36 of the ultrasonic horn 32. A protrusion 38 for fitting in the recess 25 in the upper member 21 is formed on the lower surface 36, and a pair of generally semi-circular openings 39 for the passage of the sheathed wire 10 (which is to be covered) therethrough are formed in the wall portion 37 of the ultrasonic horn 32.

The operation of this embodiment will be described.

In the water-stop structure of the sheathed wire 10, the sheathed wire 10 to be subjected to the water-stop treatment is located between the upper member 21 and lower member 22 of the water-stop member 20, and the sheathed wire 10 is guided by the wire guide grooves 21a and 22a of the upper and lower members 21 and 22, and the sheathed wire 10 is held between the water-stop portion 21b of the upper member 21 and the water-stop portion 22b of the lower member 22 (see FIG. 4A).

In this condition, the ultrasonic welding horn 32 is located at the upper side of the upper member 21 of the water-stop member 20. In this position, the protrusion 38 of the ultrasonic welding horn 32 is fitted to the recess 25 in the upper member 21, and therefore the horn 32 is located at the position closer to the water-stop portions 21b and 22b as compared with the case where the recess 25 and the protrusion 38 are not provided.

The wall portion 37, formed at the peripheral edge portion of the lower surface of the ultrasonic horn 32, generally entirely covers the upper member 21 of the water-stop member 20. In this condition, the ultrasonic welding horn 32 produces vibrations. The sheath of the sheathed wire 10, held between the water-stop portions 21b and 22b of the upper and lower members 21 and 22 of the water-stop member 20 subjected to vibrations, is melted therebetween, and also the water-stop members 21b and 22b are melted, so that the conductors 10a of the sheathed wire 10 are welded to the water-stop portions 21b and 22b.

In the ultrasonic welding, the conductors 10a of the sheathed wire 10 are welded to the water-stop portions 21b and 22b in such a manner that these conductors 10a are spread over the water-stop portions 21b and 22b (see FIG. 4B). Thus, the ultrasonic horn 32 can efficiently transmit vibrations at the region closer to the water-stop portions, and therefore the resin can be sufficiently filled between the welded conductors (see FIG. 5). Thus, the protrusion 38 is formed on the ultrasonic horn 32, while the corresponding recess 25 is formed in the outer surface of the upper member 21, and ultrasonic vibrations are applied, and therefore the ultrasonic vibrations are efficiently transmitted to the sheathed wire 10, so that the welding time can be reduced, and besides the cost can be reduced.

Figure 6:
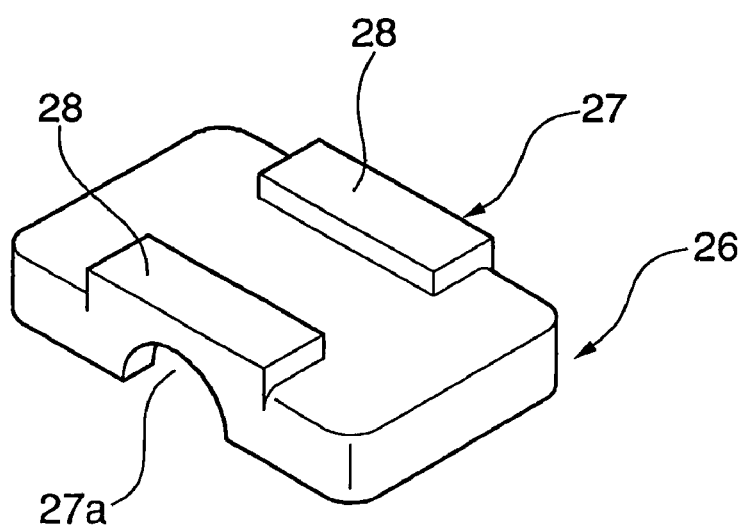
FIG. 6 is a perspective view of a water-stop member used in a second embodiment of a water-stop structure of the invention.
Figure 7:
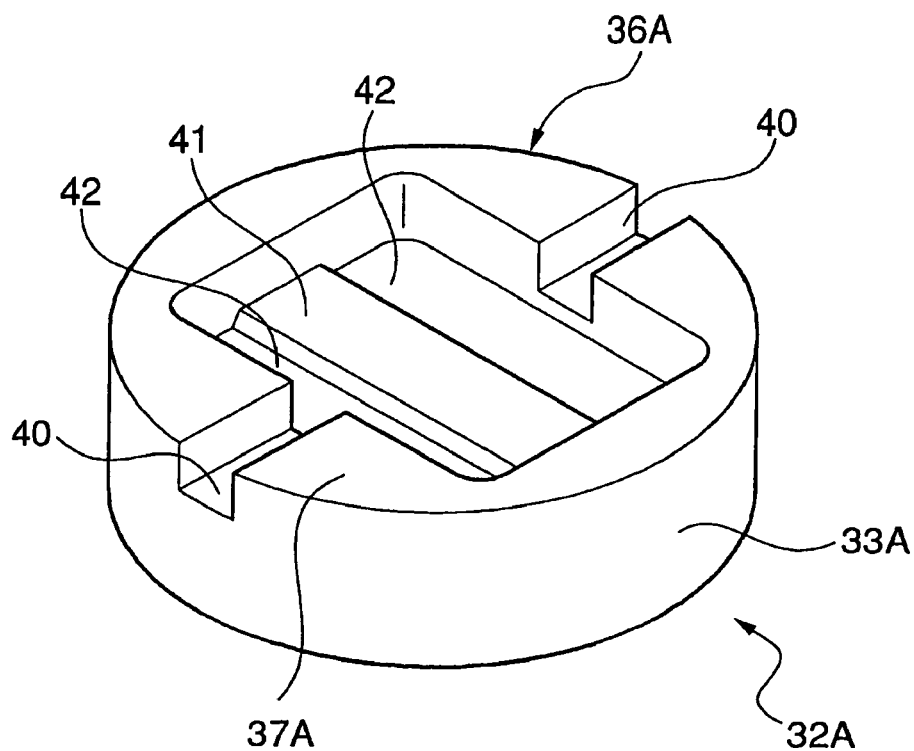
FIG. 7 is a perspective view of an ultrasonic horn used in the second embodiment of the invention.
Figure 8:
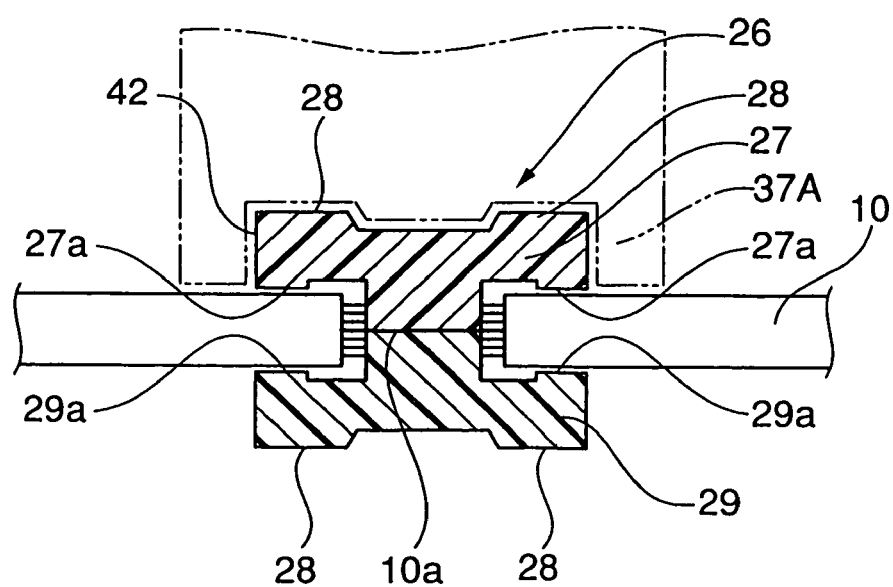
FIG. 8 is a cross-sectional view of the water-stop member of the water-stop structure in the second embodiment of the invention.
Figure 9:
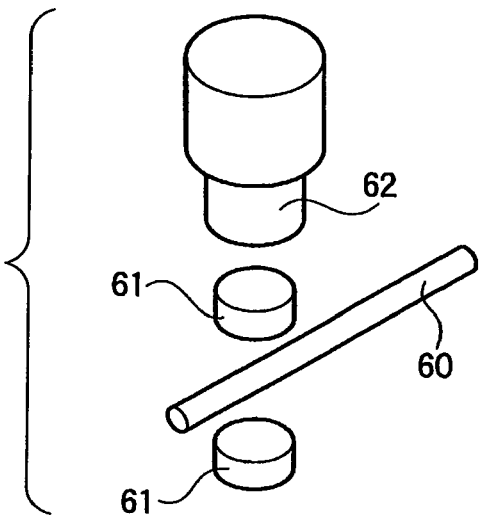
FIG. 9 is an exploded, perspective view of a conventional water-stop structure.
Figure 10:
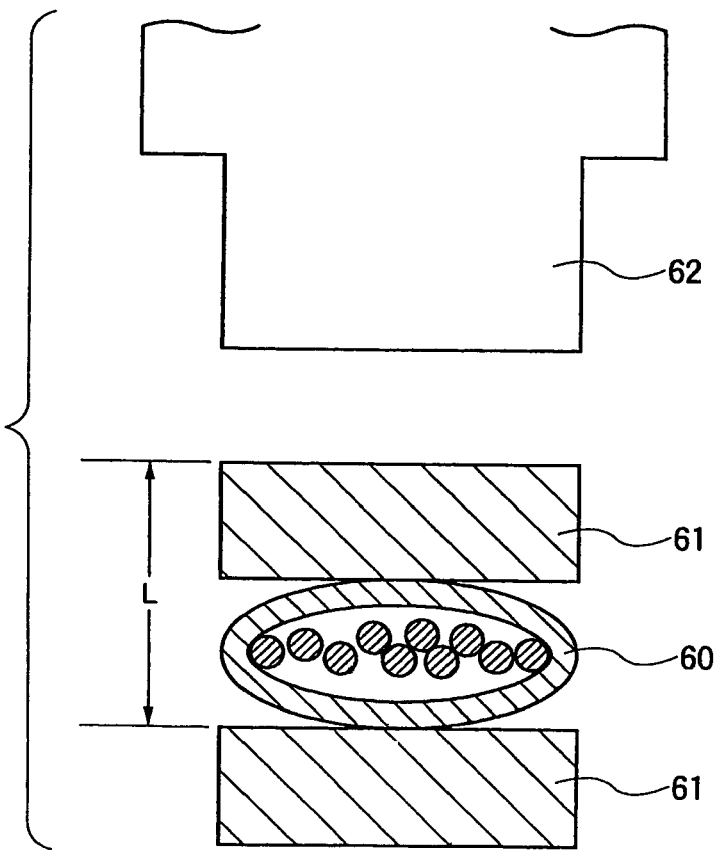
FIG. 10 is a perspective view of the conventional water-stop structure, showing a condition after welding is effected.

Next, a second embodiment of a sheathed wire water-stop structure of the invention will be described with reference to FIGS. 6, 7 and 8. FIG. 6 is a perspective view of a water-stop member used in the second embodiment of the water-stop structure of the invention. FIG. 7 is a perspective view of an ultrasonic horn used in the second embodiment of the invention. FIG. 8 is a cross-sectional view of the water-stop member of the water-stop structure of the invention. In the water-stop structure of a sheathed wire 10 shown in FIGS. 6, 7 and 8, the water-stop member 26, made of a synthetic resin, comprises an upper member 27 and a lower member 29.

The water-stop structure of this embodiment includes the water-stop member 26 comprising the upper member 27 and the lower member 29. A pair of wire guide grooves 27a are formed respectively in opposite side walls of the upper member 27, and a pair of wire guide grooves 29a are formed respectively in opposite side walls of the lower member 29, these wire guide grooves 27a and 29a serving to guide the sheathed wire 10.

Thickened projected portions 28 are formed on an upper surface of the upper member 27 to increase the thicknesses of wire outlet portions. Each of the projected portions 28 is formed to cover the whole of the corresponding wire outlet portion. The projected portions 28 increase the thicknesses of the wire outlet portions of the water-stop member, respectively, so that the strength of the wire outlet portions are markedly increased. The structure of the lower member 29 is identical to the structure of the upper member 27, and therefore description thereof will be omitted.

FIG. 7 shows the ultrasonic horn 32A. This ultrasonic horn 32A includes a generally-cylindrical body portion 33A. A wall portion 37A for covering the upper member 27 of the water stop member 26 is formed at a peripheral edge portion of a lower surface 36A of the ultrasonic horn 32A facing the upper surface of the water-stop member. A pair of openings 40 having generally rectangular groove shape for the passage of the sheathed wire 10 (which is to be covered) therethrough are formed in the wall portion 37A of the ultrasonic horn 32A.

A partition wall 41 for contact with the upper surface of the water-stop member 26 is formed on the lower surface, and groove portions 42 for respectively receiving the projected portions 28 of the upper member 27 are formed in this lower surface, and are disposed at opposite sides of the partition wall 41, respectively. In the ultrasonic welding, the sheathed wire 10, having conductors 10a (see FIG. 8) covered with a sheath, is held between the upper member 27 and the lower member 29, and in this condition ultrasonic vibrations are applied to the sheathed wire from the upper side by the ultrasonic welding horn, thereby applying a water-stop treatment to the sheathed wire 10 as described above for the first embodiment. The ultrasonic horn has such a structure that the groove portions will not contact crack-developing portions of the water-stop member, and with this construction the ultrasonic vibration energy is prevented from being transmitted directly to the weak portions (the wire outlet portions of a reduced thickness) of the structural member. The positional relation between the ultrasonic horn and the water-stop member during the ultrasonic welding is shown in phantom in FIG. 8. By providing the projected portions 28 at the wire outlet portions of the water-stop member, respectively, the strength of the wire outlet portions is markedly increased. Therefore, cracks or the like will not develop.

What is claimed is:

1. A water-stop structure of a sheathed wire, comprising:
   the sheathed wire having a conductor covered with a sheath; and
   a pair of resin water-stop members, constituted by a first member and a second member gripping the sheathed wire with water stop portions thereof which are opposed to each other and transverse to said sheathed wire, the first member having a projected portion formed thereon to increase a thickness of a part of the water-stop member near to outlet portion to the sheathed wire, said projected portion being receivable in a groove portion of an ultrasonic horn to facilitate welding of the water-stop member, wherein the wire passes entirely through the water-stop structure.

2. A water-stop device of a sheathed wire, comprising:
   the sheathed wire having a conductor covered with a sheath;
   a pair of resin water-stop members, constituted by a first member including a first water stop portion having a concave shape and a second member including a second water stop portion having a convex shape corresponding to the concave shape of the first water stop portion; and
   an ultrasonic horn having a protrusion on a lower surface thereof;
   wherein the sheathed wire is disposed between the first and second water stop portions which are opposed to each other so as to be gripped with the first and second water stop portions;
   wherein the first member has a recess disposed above the first water stop portion thereof;
   wherein the ultrasonic horn is fitted to the recess on the first member so that ultrasonic vibrations of the ultrasonic horn is transmitted to the first water-stop portion from a region closer to the first water-stop portion; and
   wherein a water stop treatment is applied to the sheathed wire by welding the first and second water stop portions by the ultrasonic-horn.

* * * * *